United States Patent
Parzygnat et al.

(10) Patent No.: US 7,336,256 B2
(45) Date of Patent: Feb. 26, 2008

(54) CONVEYING THE IMPORTANCE OF DISPLAY SCREEN DATA USING AUDIBLE INDICATORS

(75) Inventors: Kenneth James Parzygnat, Apex, NC (US); Robert Thomas Uthe, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 818 days.

(21) Appl. No.: 10/768,906

(22) Filed: Jan. 30, 2004

(65) Prior Publication Data

US 2005/0168436 A1    Aug. 4, 2005

(51) Int. Cl.
G09G 5/00    (2006.01)
(52) U.S. Cl. .................. 345/156; 345/157; 715/862
(58) Field of Classification Search ........ 345/156–170, 345/172–175, 179–184, 87–88, 98, 214, 345/700–701, 710; 715/858, 862
See application file for complete search history.

(56) References Cited

U.S. PATENT DOCUMENTS 5,991,693 A * 11/1999 Zalewski .................... 701/300
6,046,722 A    4/2000 McKiel, Jr. .................. 345/145
6,489,951 B1   12/2002 Wong et al. ................. 345/173
6,639,614 B1 * 10/2003 Kosslyn et al. ............. 715/837
7,208,671 B2 *  4/2007 Chu ............................ 84/609

FOREIGN PATENT DOCUMENTS

WO    03014969    2/2003

* cited by examiner

Primary Examiner—Richard Hjerpe
Assistant Examiner—Mansour M. Said
(74) Attorney, Agent, or Firm—David R. Irvin

(57) ABSTRACT

An audible indicator such as an audio tone is associated with the importance of data elements displayed on a visual display screen of data processing apparatus such as a personal computer or work station. At least one characteristic of the audible indicator, for example its pitch or frequence of a tone, is associated with the importance of the data elements. When a user selects a particular date element on the screen, for example using a computer mouse, the audible indicator conveys the importance of the selected data element to the user. This enables visually impaired users to readily locate important data elements on a display screen without reading the entire screen using a screen reader.

22 Claims, 2 Drawing Sheets

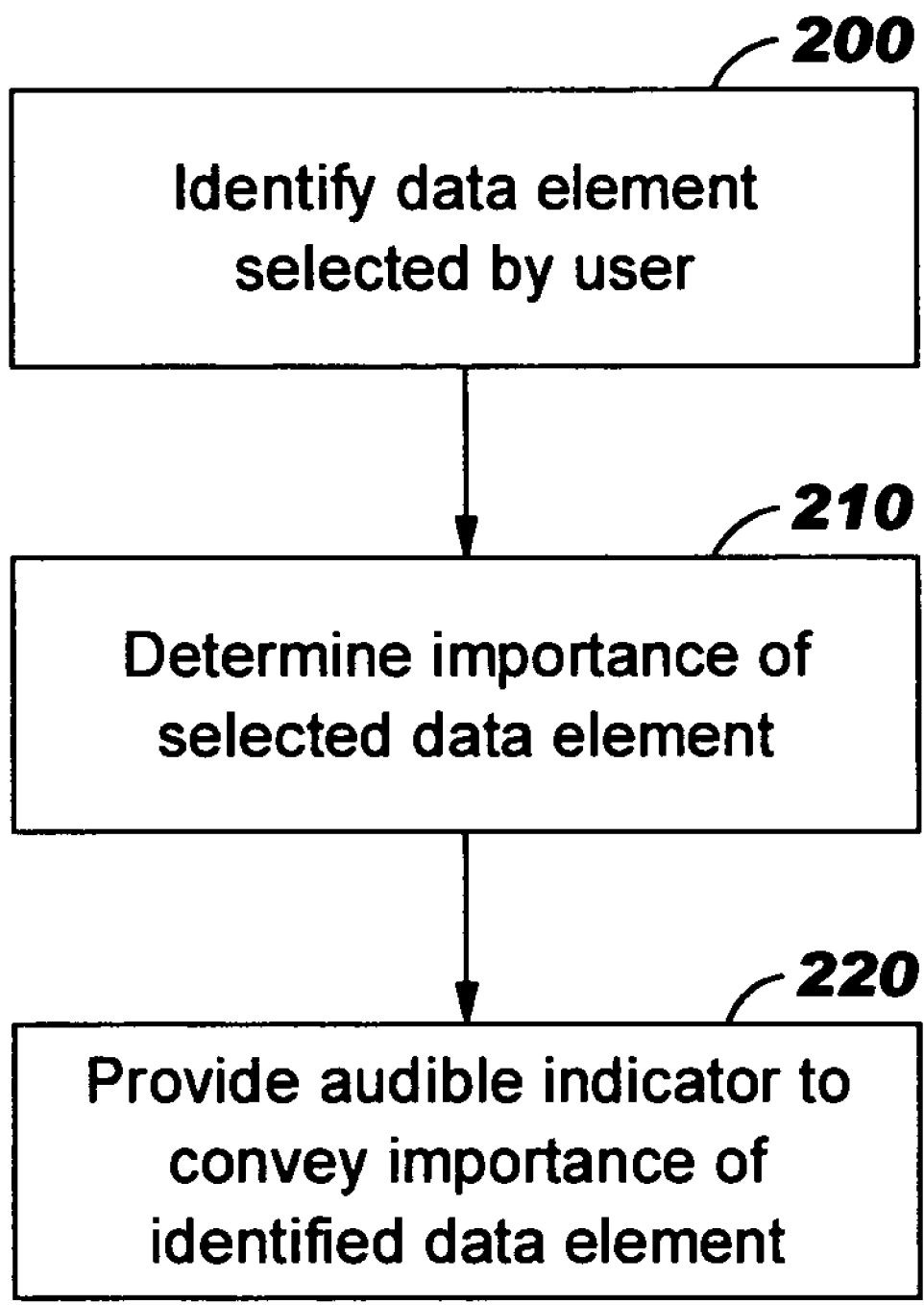

CONVEYING THE IMPORTANCE OF DISPLAY SCREEN DATA USING AUDIBLE INDICATORS

FIELD OF THE INVENTION

The invention pertains to the field of information presentation, and more particularly to a method and computer program product that enables visually impaired users to readily locate important data elements displayed on a crowded screen without reliance on a screen reader.

BACKGROUND

How to locate important information on a crowded visual display screen is a long-standing problem for the visually impaired who need to use data processing apparatus such as personal computers, special-purpose workstations, operator control panels, and the like.

Today, visually impaired users rely upon screen readers, which convert the content of a display screen to synthesized speech. Typically, a screen reader begins at the upper-left-hand corner of the screen, reading lines from left to right, progressing from the top of the screen to the bottom. Although screen readers enable the visually impaired to comprehend everything on the screen, they are painfully slow, especially when a user is uninterested in, or already familiar with, much of the content of a crowded display screen.

Thus, there is a need to provide visually impaired users with a way to readily locate important information on a crowded display screen, so that they may deal directly with this important information rather than plod through the entire screen using a screen reader.

SUMMARY

The present invention conveys the importance of data on a display screen by using audible indicators. When a user selects a data element on the screen, for example by pointing to the element with a computer mouse, the audible indicator conveys the importance of the data element to the user. Here, a data element can be a line, column, or block of text; an alphanumeric character or a word of text; a form field to be filled-in or a form field that has been filled-in incorrectly; and the like. In one embodiment of the invention, the audible indicator is a tone whose frequency varies according to the importance of the selected data element, where the tone conveys greater importance using a higher frequency.

BRIEF DESCRIPTION OF THE DRAWINGS

FIG. 2 is a flowchart that shows aspects of an exemplary method encompassed by the invention.

DETAILED DESCRIPTION

Figure 1:
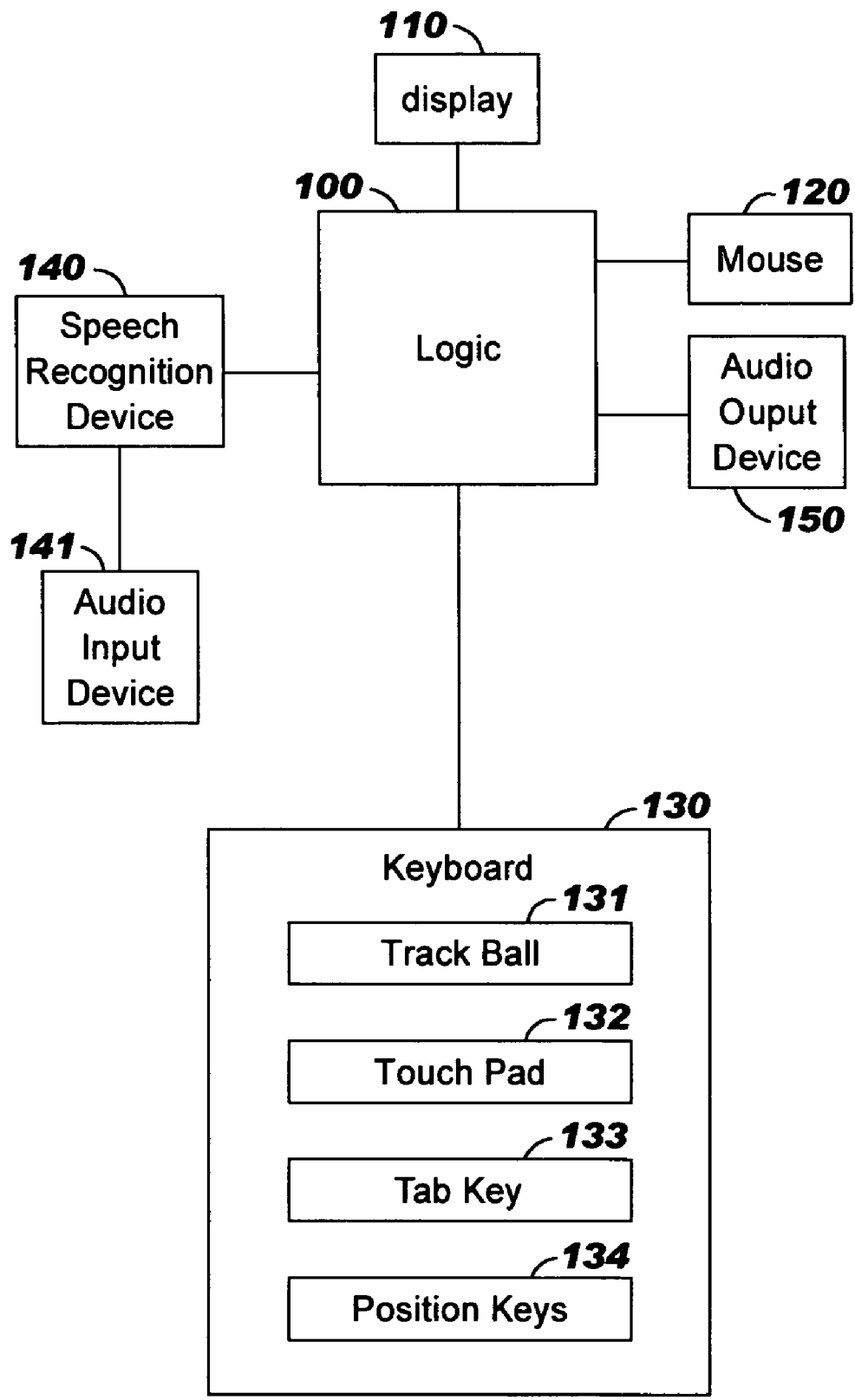
FIG. 1 is a block diagram that shows exemplary apparatus suitable for implementation of the invention.

The present invention conveys the importance of data elements on a display screen by using audible indicators. When a user selects a data element on the screen, for example by pointing to or passing over the element with a computer mouse, the audible indicator conveys the importance of the data element to the user. Thus the invention enables a visually impaired user to readily locate important data elements on a crowded display screen, rather than plod through the entire screen using a screen reader. Although the invention is suitable for use by the visually impaired, and beneficial thereto, this is but one use of the invention, which is not so limited in general.

FIG. 1 is a block diagram that shows an exemplary configuration suitable for implementing the invention. The structure shown in FIG. 1 is generally that of a personal computer. Implementation of the invention is not limited to this structure, however, and the invention may be implemented as well using a special-purpose workstation or special-purpose logic, and more generally by any appropriate apparatus that includes logic and a visual display.

The exemplary configuration shown in FIG. 1 includes logic 100. For purposes of understanding the invention, the logic 100 may be thought of as the central processing unit (CPU) of a personal computer, although implementation of the invention is not so limited. Among the purposes of the logic may be the execution of instructions of an application program, as well as the execution of instructions of an operating system that directs other elements shown in FIG. 1.

A display 110 provides visual output under direction of the logic 100. Typically, the display 110 may be a video monitor having a color CRT or LCD. The visual output may be thought of as comprising various data elements. A data element may be expressed to the user as an icon or an image; a graphical shape such as a square, circle, line, and such; a field to be filled-in by the user; an alphanumeric character or word; a row, column or block of characters or words; and the like.

The various data elements shown on the display may have various importance. For example, if the screen presents a form for the user to fill-in, the fields that accept the user's entries may be thought of as having higher importance than other information shown by the display. Continuing this example, a field that has been filled-in incorrectly may be thought of as having higher importance that a field that has been filled-in correctly. In another example, the data elements may be alerts or other operational reports from a network management system. Typically, these have differing importance, which today is conveyed to the network management operator using color coding. For example, an alert reporting the catastrophic failure of an essential component such as a backbone network router could be displayed in red, whereas a utilization report that falls within the router's normal operating range could be displayed in green.

Unlike today's methods, the present invention associates an audible indicator with the importance of data elements, and provides the audible indicator to the user. The audible indicator may be generated by the logic 100 using digital signal processing techniques, or by a special purpose device. In one embodiment of the invention, the audible indicator is a tone whose pitch or frequency varies according to the importance of the associated data elements, so that the importance of the data elements may be conveyed to a visually impaired user. For example, a higher-frequency tone may be associated with a more important data element, and a lower-frequency tone with a less important data element. In another embodiment, the audible indicator may be a periodic train of clicks like those provided by a Geiger counter, where the period is shorter for a more important data element and longer for a less important data element. In another embodiment, the audible indicator may alternate between two or more tones of different frequencies, where the rate of alternation is proportional to the importance of the associated data element. In yet another embodiment, the audible indicator may alternate between two tones of different frequencies, where the rate of alternation is proportional to the importance of the data element in question and wherein one of the tones is essentially silent, so that the other tone conveys repetitive "beeps" to the user. In still another embodiment, the audible indicator may alternate between two tones of different frequencies, where the rate of alternation is proportional to the importance of the data element in question and wherein one of the tones conveys the distance between the present location of a screen cursor and a data element in question. For example, one of the tones may vary in frequency in dependence upon the distance between the most important data element and the present location of a cursor that is controlled by a computer mouse, so that variations in frequency responsive to moving the mouse may be used to guide the user to the data element in question.

A computer mouse 120 may enable the user to select a data element on the screen of the display 110 for examination. The user may also select data elements on the screen of the display 110 using a keyboard 130 as an alternative to the mouse 120 or in addition to the mouse 120. The keyboard 130 may include a track ball 131, a touch pad 132, a tab key 133, or up-down, left-right position keys 134 that perform essentially the same kinds of functions as the mouse 120. Here, it is not a requirement that the keyboard 130 be a full-character-set keyboard; the invention applies as well to an abbreviated keypad.

FIG. 1 also shows a speech recognition device 140 and an audio-input device 141 such as a microphone. Typically, these enable a user to enter data, text, and commands into the logic 100 without using the mouse 120 or the keyboard 130. For example, spoken language may be converted into English-language text, which appears on the display 110. The speech recognition device 140 may also be used to identify data elements on the display 110 according to instructions spoken by the user.

Also shown in FIG. 1 is an audio-output device 150. This may be a loudspeaker, a headphone or earpiece, a limited-fidelity transducer, and so forth. One purpose of the audio-output device 150 is to transduce the audio indicator that conveys the importance of data elements identified by the user on the display 110 by way of the mouse 120, the keyboard 130, or the speech detector 140.

FIG. 2 is a flowchart that shows aspects of an exemplary method encompassed by the invention. As shown in FIG. 2, a data element selected by the user is identified (step 200). Data elements may be identified according to a screen location on the display 110 indicated by the computer mouse 120, the computer track ball 131, the computer touch pad 132, the tab key 133, the position keys 134, or by spoken instructions that are interpreted by the speech detector 140. The data element may also be identified implicitly, as in the example of a form-field to be filled-in by the user, or a form-field that has been incorrectly filled-in.

The importance of the identified data element is then determined (step 210). This determination may be done in a number of different ways within the scope of the invention. For example, a program instruction or result that causes the display 110 to display the data element may have an explicit encoding that gives the priority of the data element. A four-bit field could indicate sixteen levels of priority, which could be associated with sixteen different audible tones, and so forth. The priority may also be determined by reading an encoding used primarily for another purpose, and deducing an associated priority. For example, priority may be derived from display color encodings, associating various audible frequencies with various colors. In another example, priority may be deduced from numerical parameter values, associating various priorities with various ranges or values of parameters, or deduced from date-element categories.

The audible indicator is then provided to the user by way of the audio output device 150 (Step 220). Thus the user may quickly examine a number of data elements, for example by running the mouse down one of the columns of the screen, listening to the audible indicator, to find data elements of high importance.

The present invention may, of course, be carried out in other specific ways than those set forth herein without departing from the spirit and essential characteristics of the invention. The present embodiments are, therefore, to be considered in all respects as illustrative rather than limiting, and all changes coming within the meaning and equivalency of the claims that follow are intended to be embraced therein.

We claim:

1. A method for conveying the importance of display screen data, comprising the steps of:
   identifying a data element selected by a user on a visual display screen;
   determining the importance of the identified data element; and
   providing an audible indicator to convey the importance of the identified data element to the users;
   wherein the audible indicator is selected from the set of audible indicators that consists of an audio tone whose pitch varies in dependence upon the importance of the identified data element, a periodic train of audible clicks with a period that varies in dependence upon the importance of the identified data element, an audio signal that varies between a plurality of audible tones at a rate that depends upon the importance of the identified data element, and an audio signal that varies between two audible tones at a rate that depends upon the importance of the identified data element wherein one of the two tones is essentially silent and the other is not, so as to convey a periodic train of audible beeps to the user with a period that varies in dependence upon the importance of the data element.

2. The method of claim 1, wherein the data element is identified according to a screen location indicated by a computer mouse operated by the user.

3. The method of claim 1, wherein the data element is identified according to a screen location indicated by a computer track ball operated by the user.

4. The method of claim 1, wherein the data element is identified according to a screen location indicated by a computer touch pad operated by the user.

5. The method of claim 1, wherein the data element is identified according to a tab key operated by the user.

6. The method of claim 1, wherein the data element is identified according to position keys operated by the user.

7. The method of claim 1, wherein the data element is identified according to instructions spoken by the user.

8. The method of claim 1, wherein the data element is a form field that accepts input from the user.

9. The method of claim 1, wherein the importance of the data element is determined by reading an encoding that explicitly gives the importance.

10. The method of claim 1, wherein the importance of the data element is determined by reading an encoding and deducing the importance from the read encoding.

11. The method of claim 10, wherein the encoding indicates a display color.

12. A program storage device readable by a computer, tangibly embodying a program of instructions executed by the computer to impart functionality to the computer to perform method steps for conveying the importance of display screen data, said method steps comprising:

identifying a data element selected by a user on a visual display screen;

determining the importance of the identified data element; and providing an audible indicator to convey the importance of the identified data element to the user;

wherein the audible indicator is selected from the set of audible indicators that consists of an audio tone whose pitch varies in dependence upon the importance of the identified data element, a periodic train of audible clicks with a period that varies in dependence upon the importance of the identified data element, an audio signal that varies between a plurality of audible tones at a rate that depends upon the importance of the identified data element, and an audio signal that varies between two audible tones at a rate that depends upon the importance of the identified data element wherein one of the two tones is essentially silent and the other is not, so as to convey a periodic train of audible beeps to the user with a period that varies in dependence upon the importance of the data element.

13. The program storage device of claim 12, wherein the data element is identified according to a screen location indicated by a computer mouse operated by the user.

14. The program storage device of claim 12, wherein the data element is identified according to a screen location indicated by a computer track ball operated by the user.

15. The program storage device of claim 12, wherein the data element is identified according to a screen location indicated by a computer touch pad operated by the user.

16. The program storage device of claim 12, wherein the data element is identified according to a tab key operated by the user.

17. The program storage device of claim 12, wherein the data element is identified according to position keys operated by the user.

18. The program storage device of claim 12, wherein the data element is identified according to instructions spoken by the user.

19. The program storage device of claim 12, wherein the data element is a form field that accepts input from the user.

20. The program storage device of claim 12, wherein the importance of the data element is determined by reading an encoding that explicitly gives the importance.

21. The program storage device of claim 12, wherein the importance of the data element is determined by reading an encoding and deducing the importance from the read encoding.

22. The program storage device of claim 21, wherein the encoding indicates a display color.

* * * * *